UNITED STATES PATENT OFFICE.

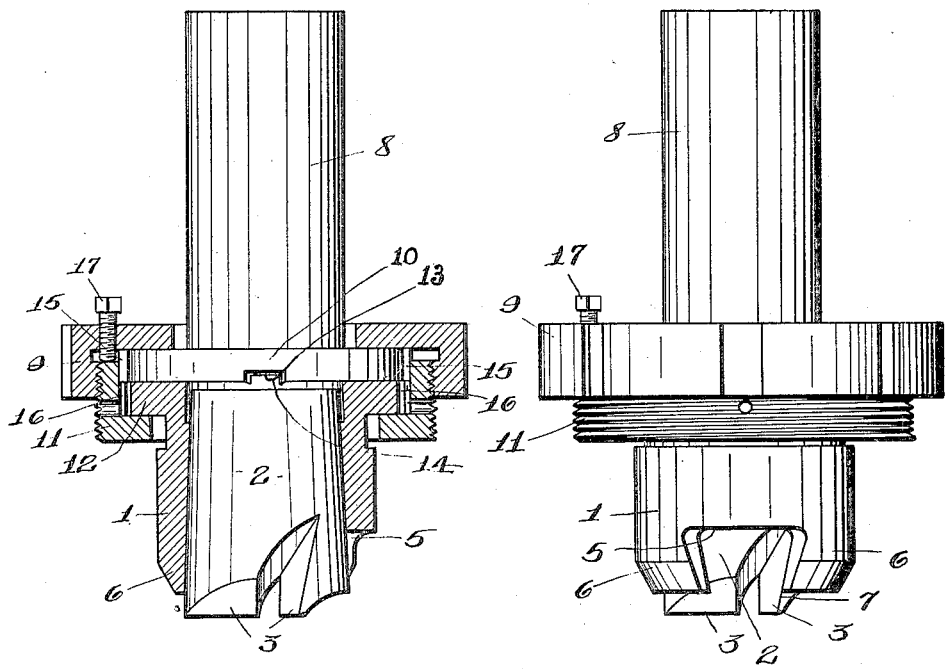

WALTER W. BAKER AND FREDERICK W. FRANKLIN, OF SYRACUSE, NEW YORK.

TOOL AND HOLDER THEREFOR.

1,424,392.

Specification of Letters Patent.   Patented Aug. 1, 1922.

Application filed May 16, 1919. Serial No. 297,602.

*To all whom it may concern:*

Be it known that we, WALTER W. BAKER and FREDERICK W. FRANKLIN, citizens of the United States, and residents of Syracuse, in the county of Onondaga and State of New York, have invented a certain new and useful Tool and Holder Therefor, of which the following is a specification.

This invention relates to tools and tool holders, and has for its object a particularly simple, efficient and rigid construction whereby the tool is readily placed in the holder and readily held during turning. The invention consists in the novel features and in the combinations and constructions hereinafter set forth and claimed.

In describing this invention, reference is had to the accompanying drawings in which like characters designate corresponding parts in all the views.

Figure 1 is a side elevation of one embodiment of this tool and holder.

Figure 2 is a vertical sectional view, partly in elevation of parts seen in Fig. 1.

Figures 3 and 4 are end and side elevations of the tool.

The tool holder comprises a sleeve 1 encircling the tool 2 and terminating short of but near the cutting edges of the end teeth 3 of the tool and means for holding the sleeve to transmit rotary movement thereto, this means engaging the sleeve nearer the teeth compared with the distance between the teeth and point of support of the tool in other forms of tool holders.

As here illustrated the tool 2 is a hollow mill and the teeth 3 extend from within the bore of the sleeve slightly beyond the outer end of the sleeve, and the tool is rigidly and frictionally supported in the sleeve by tapering the bore and the tool throughout the length of the tool so that the tool has a bearing in the sleeve throughout its length. The tool terminates at its inner end near the inner end of the sleeve.

The sleeve 1 is preferably formed with contacts 5 at its outer end forming projections 6. The contacts are arranged in alinement with the spaces between the teeth 3 and provide a clearance for the chips, and the projections 6 lap said teeth and brace them during the cutting operation. One side of each contact 5 is lined with the cutting edge 7 of one of the teeth 3. Thus breaking of the teeth is eliminated. Owing to the sleeve a short tool firmly supported throughout can be used thus effecting a great saving in tool stock and the teeth are supported near their cutting edges avoiding breaking of the teeth.

The sleeve is held at its inner end by means for coupling it to a shank 8 for engaging with a chuck not shown, said means including a collar 9 on the shank and overlying a head 10 formed on the lower end of the shank, and having internal threads opposed and spaced from the periphery of the head, and a second collar 11 mounted on the sleeve and having an internal flange engaging the under face of a head 12 on the inner end of the sleeve, the collar 11 being externally threaded and turning into the internal threads of the collar 9 to draw the sleeve 1 upwardly and abut the head 12 thereof against the head 10 of the shank. The heads 10 and 12 are provided with radial complemental grooves and tongues 13, 14 and also the head 10 and collar 11 are provided with interlocking peripheral and internal lugs and notches 15, 16.

In order that the sleeve 1 and tool 2 may have a sight radial or centering action when desired, means is provided for limiting the movement of the collars 9 and 11 toward each other and hence permitting a rocking movement between the heads 10 and 12. This means consists of one or more stop screws 17 extending through the collar 9 and abutting against the top edge of the collar 11. The screw 17 also holds the collar 9 from turning when it is set loose enough to permit the universal action of the sleeve 1 and tool 2.

The construction of the holder for the sleeve forms the subject matter of an application executed of even date herewith.

This tool and holder is particularly advantageous in that the tool is supported practically throughout its length by a sleeve which is held at a point comparatively near the cutting end of the tool.

What we claim is:

1. The combination of a tool holder comprising a sleeve, and a tool fitting the sleeve and insertable therein from the outer end of the sleeve, the sleeve enclosing the tool and extending to near the lower end thereof, the tool having cutting teeth at its end, and the sleeve terminating near and short of the ends of the cutting teeth, and actuating means coacting with the upper end of the holder, substantially as and for the purpose described.

2. The combination of a tool holder comprising a sleeve, and a tool insertable in the sleeve from the outer end thereof, and fitting the bore of the sleeve, the sleeve enclosing the tool and extending nearly to the lower end thereof and the tool having cutting teeth at its end, and the sleeve terminating near and short of the ends of the cutting teeth and being provided with cutouts arranged in alinement with the notches between the teeth, and actuating means coacting with the holder, substantially as and for the purpose specified.

In testimony whereof, we have hereunto signed our names at Syracuse, in the county of Onondaga, and State of New York, this 28th day of April, 1919.

WALTER W. BAKER.
FREDERICK W. FRANKLIN.